(12) United States Patent
Evans et al.

(10) Patent No.: US 12,145,221 B2
(45) Date of Patent: Nov. 19, 2024

(54) SHIELDING AND COOLING A CONTINUOUS WELD BETWEEN STEEL SHEETS/PLATES USING A NON-OXIDIZING ATMOSPHERE TO REDUCE THE FORMATION OF OXIDE ON A SURFACE OF THE CONTINUOUS WELD

(71) Applicant: AK Steel Properties, Inc., West Chester, OH (US)

(72) Inventors: James Frederick Evans, Middletown, OH (US); Steven Wayne Streibick, Middletown, OH (US); Stephen Bryant Tate, Midland, NC (US)

(73) Assignee: Cleveland-Cliffs Steel Properties Inc., Cleveland, OH (US)

( * ) Notice: Subject to any disclaimer, the term of this patent is extended or adjusted under 35 U.S.C. 154(b) by 430 days.

(21) Appl. No.: 16/839,406

(22) Filed: Apr. 3, 2020

(65) Prior Publication Data
US 2020/0316726 A1 Oct. 8, 2020

Related U.S. Application Data

(60) Provisional application No. 62/829,741, filed on Apr. 5, 2019.

(51) Int. Cl.
*B23K 37/00* (2006.01)
*B23K 35/38* (2006.01)
(Continued)

(52) U.S. Cl.
CPC ........ *B23K 37/0282* (2013.01); *B23K 35/383* (2013.01); *B23K 37/003* (2013.01); *B32B 15/011* (2013.01)

(58) Field of Classification Search
CPC . B23K 26/044; B23K 26/242; B23K 37/0531
See application file for complete search history.

(56) References Cited

U.S. PATENT DOCUMENTS

| | | | | |
|---|---|---|---|---|
| 1,746,081 A | * | 2/1930 | Hobart | B23K 9/173 |
| | | | | 76/DIG. 5 |
| 2,644,070 A | * | 6/1953 | Herbst | B23K 9/167 |
| | | | | 219/74 |

(Continued)

FOREIGN PATENT DOCUMENTS

| | | |
|---|---|---|
| CN | 201871857 U | 6/2011 |
| CN | 103722279 A | 4/2014 |

(Continued)

OTHER PUBLICATIONS

International Search Report and Written Opinion dated Jul. 21, 2020 for Application No. PCT/US2020/026494, 14 pages.

(Continued)

*Primary Examiner* — Erin B Saad
(74) *Attorney, Agent, or Firm* — Frost Brown Todd LLP

(57) ABSTRACT

An apparatus for use in a continuous welding system including a welding head configured to remain stationary relative to translating steel sheets or plates. The apparatus includes a hollow elongate body and a port. The body extends between two closed ends. The port is coupled to a non-oxidizing gas source and in communication with the body. The body defines a plurality of openings. The openings are configured to direct non-oxidizing gas towards the steel sheets or plates to simultaneously shield a weld formed by the welding head from atmosphere and cool the weld.

7 Claims, 7 Drawing Sheets

(51) Int. Cl.
*B23K 37/02* (2006.01)
*B32B 15/01* (2006.01)

(56) References Cited

U.S. PATENT DOCUMENTS

| | | | | |
|---|---|---|---|---|
| 2,902,587 A * | 9/1959 | Bernard | B23K 9/173 | |
| | | | 219/130.51 | |
| 3,125,666 A * | 3/1964 | Gorman et al. | B23K 9/164 | |
| | | | 219/74 | |
| 3,570,109 A * | 3/1971 | Harlan et al. | B23K 37/0531 | |
| | | | 228/221 | |
| 3,875,364 A * | 4/1975 | Boyett | B23K 9/167 | |
| | | | 219/136 | |
| 5,003,150 A * | 3/1991 | Stricklen | B23K 9/167 | |
| | | | 219/136 | |
| 5,388,753 A * | 2/1995 | Bjorkman, Jr. | B23K 9/164 | |
| | | | 228/42 | |
| 5,393,948 A * | 2/1995 | Bjorkman, Jr. | B23K 9/325 | |
| | | | 219/136 | |
| 5,641,417 A * | 6/1997 | Glagola | B23K 9/167 | |
| | | | 219/136 | |
| 9,827,633 B2 | 11/2017 | Schmit et al. | | |
| 10,151,009 B2 | 12/2018 | Pellman et al. | | |
| 2016/0368089 A1 * | 12/2016 | Grapov | B23K 26/032 | |
| 2017/0334009 A1 * | 11/2017 | Muchtar | B23K 9/173 | |
| 2020/0114455 A1 * | 4/2020 | Wu | B23K 9/167 | |

FOREIGN PATENT DOCUMENTS

| | | |
|---|---|---|
| CN | 105499764 A | 4/2016 |
| CN | 206405580 U | 8/2017 |
| DE | 2525268 | 12/1976 |
| DE | 102009025260 | 12/2010 |
| EP | 2654984 | 10/2013 |
| JP | H02-133268 | 11/1990 |
| JP | 2006-175475 | 7/2006 |
| JP | 2016-087635 | 5/2016 |
| JP | 2016-168621 | 9/2016 |
| KR | 10-2006-0067592 | 12/2004 |
| WO | WO 2007/052072 | 5/2007 |

OTHER PUBLICATIONS

Chinese Office Action dated Jun. 15, 22 for Application No. 202080026797.6, 8 pages.
Japanese Office Action dated Nov. 29, 2022 for Application No. 2021-559246, 4 pages.
Japanese Office Action dated Apr. 4, 2023 for Application No. 2021-559246, 5 pages.
Korean Office Action dated Feb. 10, 2023 for Application No. 10-2021-7031311, 8 pages.
European Communication dated Apr. 26, 2024 for Application No. 20723611.8, 5 pages.

* cited by examiner

SHIELDING AND COOLING A CONTINUOUS WELD BETWEEN STEEL SHEETS/PLATES USING A NON-OXIDIZING ATMOSPHERE TO REDUCE THE FORMATION OF OXIDE ON A SURFACE OF THE CONTINUOUS WELD

PRIORITY

This application claims priority to U.S. Provisional Application Ser. No. 62/829,741, entitled SHIELDING AND COOLING A CONTINUOUS WELD IN HOT STAMPED STEEL USING A NON-OXIDIZING ATMOSPHERE TO REDUCE THE FORMATION OF OXIDE ON THAT CONTINUOUS WELDING SURFACE 2-2, filed on Apr. 5, 2019, the disclosure of which is incorporated by reference herein.

BACKGROUND

Steel plates and/or sheets can be joined using a variety of welding processes and in a variety of contexts. In some contexts, such steel sheets/plates can be subjected to hot-dip coating after welding to adhere a variety of metallic coatings to one or more surfaces of the welded steel sheets/plates. In some contexts, adhesion between the steel substrate and the metallic coating can be challenging due to oxide formation at or near the weld.

During welding, abutting steel sheets/plates can be heated to relatively high temperatures. Under some circumstances, temperatures can be high enough so that a portion of one or more of the steel sheets/plates reacts to oxygen in the surrounding atmosphere to generate surface oxides or scale. If such oxides remain on the surface of the steel sheets/plates after welding, challenges with coating integrity and/or adherence can appear when the weld area is subjected to subsequent hot-dip metallic coating. For instance, in some contexts, the metallic coating may not fully wet to the surface of the weld area during hot-dip coating. These challenges may be aggravated during subsequent processing operations such as annealing, hot-stamping, and/or etc. Thus, there is a need to develop devices and methods to reduce the propensity of steel sheets/plates to oxidize during welding. While several devices and methods have been made and used in the context of steel manufacturing, it is believed that no one prior to the inventor has made or used the invention described in the appended claims.

DETAILED DESCRIPTION

Figure 1:
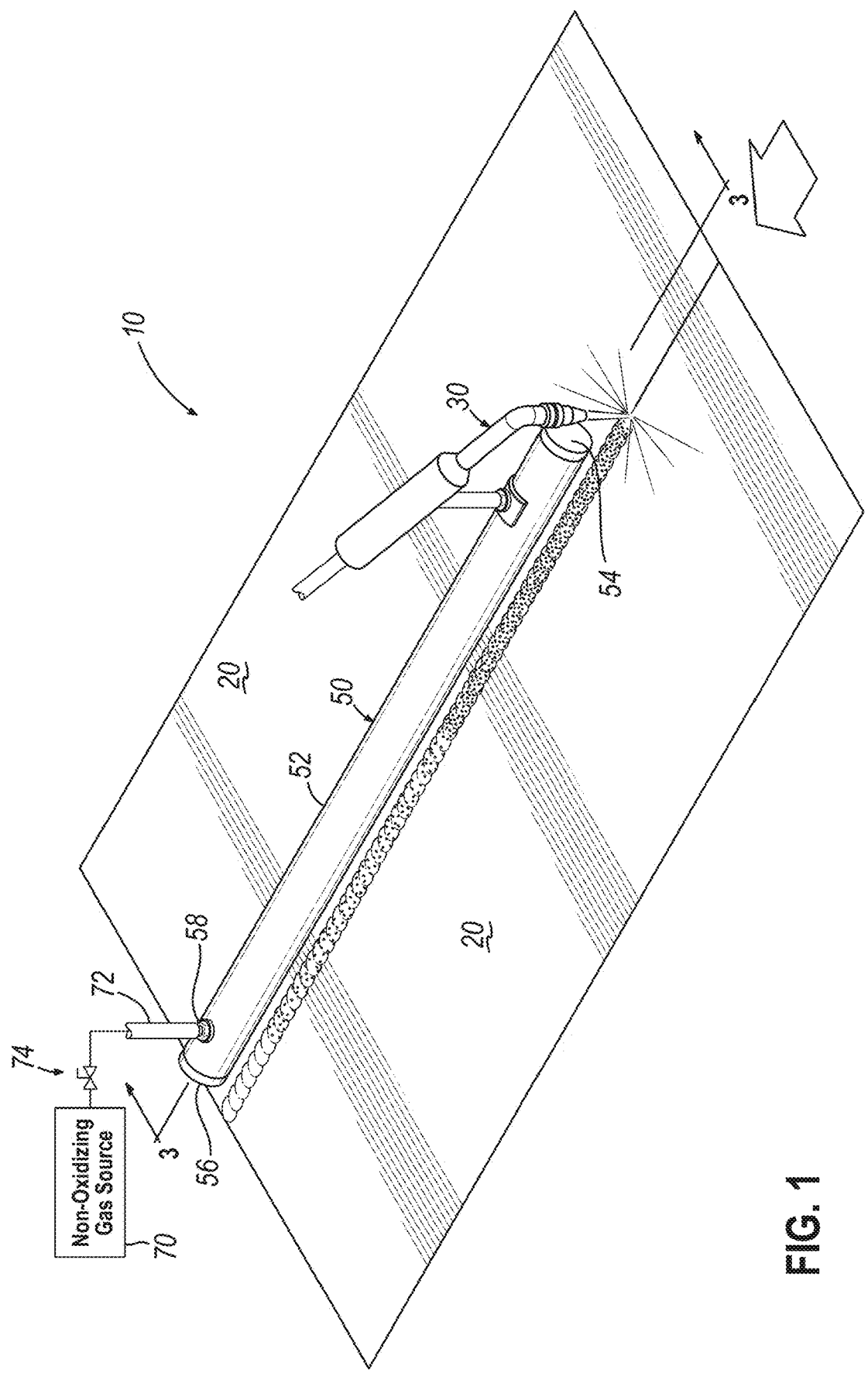
FIG. 1 depicts a perspective view of an exemplary continuous seam welding system.

FIG. 1 shows an exemplary continuous seam welding system (10). In welding system (10), two sheets and/or plates (20) are moved continuously relative to a stationary welding head (30). Thus, it should be understood that welding system (10) of the present example can be readily integrated into a continuous material processing system with sheets/plates (20) threaded through a variety of material processing areas using rollers or the like. However, it should be understood that in other examples, welding system (10) can be used as a standalone system and not integrated with other material processing systems. Thus, although sheets/plates (20) are shown as moving relative to a stationary welding head (30), in other examples, welding head (30) can be configured to move, while sheets/plates (20) remain stationary. Of course, various alternative configurations can be used as will be apparent to those of ordinary skill in the art in view of the teachings herein.

Sheets/plates (20) in the present example can comprise carbon steel or other steel products. Although sheets/plates (20) can comprise identical materials, in some examples the material of each plate (20) can be varied. For instance, in some examples, sheets/plates (20) can be used to form a tailor welded coil, which can later be formed into various tailor welded blanks. In such examples, sheets/plates (20) can be varied in terms of materials, dimensions, and material properties. Such a configuration may be desirable to provide different properties across a cross-sectional area of a steel blank.

Welding head (30) of the present example can be configured to perform a variety welding operations. For instance, in some examples, welding head (30) can be configured to perform gas tungsten arc welding (GTAW). In other examples, welding head (30) can be configured to perform laser welding. In still other examples, welding head (30) can be configured to perform resistance welding. In yet other examples, welding head (30) can be configured to perform gas metal arc welding (GMAW). In yet other examples, welding head (30) can be configured to perform shielded arc welding (SAW). Of course, in yet other examples, welding head (30) can be configured to perform a variety of other alternative welding operations, or combinations thereof, as will be apparent to those of ordinary skill in the art in view of the teachings herein.

Although not shown, it should be understood that welding head (30) can be associated with a variety of other associated welding components. For instance, welding head (30) can be associated with one or more of a power source, a gas source, a filler metal source, and/or etc. In addition, or in the alternative, welding head (30) can also be associated with one or more controllers to coordinate welding with one or more other components of system (10). For instance, in one example, one or more controllers can be used to coordinate welding operational parameters such as current and/or voltage with the feed speed of sheets/plates (20). Still, other uses of such controllers will be apparent to those of ordinary skill in the art in view of the teachings herein.

Welding head (30) of the present example is shown as being positioned relative to sheets/plates (20) to form a flat butt-weld between sheets/plates (20). However, it should be understood that in other examples, welding head (30) can be positioned in a variety of alternative positions. For instance, in some examples, welding head (30) can be positioned to weld in the horizontal, vertical, or overhead position. In addition, or in the alternative, in some examples welding head (30) can include multiple welding heads to form welds at multiple positions in a single pass (e.g., flat and overhead).

Welding system (10) of the present example further includes a header (50) or shroud extending away from welding head (30) in the trailing direction. Header (50) of the present example is generally configured to shield a fresh weld formed by welding head (30) from atmosphere while cooling the fresh weld for a predetermined period of time. This simultaneous shielding and cooling action is generally achieved by the presence of one or more openings, pores, and/or orifices in header (50) oriented towards sheets/plates (20) and/or the location of the weld. Thus, it should be understood that header (50) is generally configured to direct shielding gas onto the surface of the weld for a predetermined time corresponding to the length of header (50).

Header (50) of the present example is configured as an elongate hollow structure. As will be described in greater detail below, the hollow structure of header (50) is generally configured to direct the flow of gas though header (50) to the weld. Although header (50) of the present example is shown as having a tubular or cylindrical structure, it should be understood that in other examples different structures may be used. For instance, in some examples, header (50) can be configured with a square or rectangular cross-section. In other examples, header (50) can be configured with an oval-shaped cross-section. In still other examples, header (50) can be configured with an irregular shape such as a c-shaped cross-section or a pancake cross-section. Of course, various alternative shapes for header (50) will be apparent to those of ordinary skill in the art in view of the teachings herein.

Figure 2:
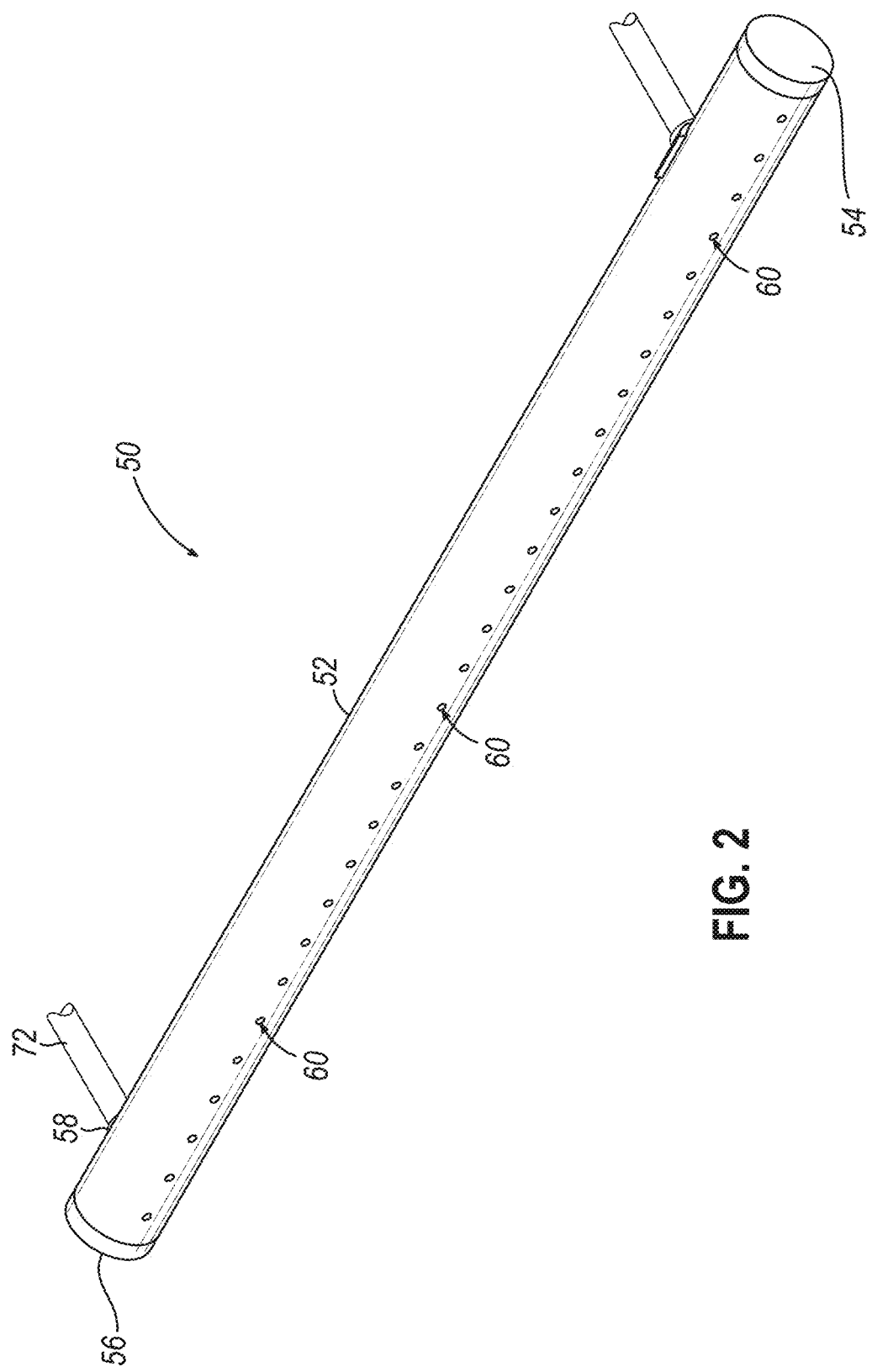
FIG. 2 depicts a perspective view of an exemplary header of the continuous seam welding system of FIG. 1.

As best seen in FIG. 2, header (50) includes an elongate body (52), a closed front end (54), a closed rear end (56), a port (58). As will be described in greater detail below, the combination of body (52) and closed ends (54, 56) act to distribute gas from port (58) through header (50) and towards the weld between sheets/plates (20). Header (50) of the present example is generally formed of a single material such that elongate body (52), ends (54, 56) are of a single material. However, in other examples, header (50) may be formed of multiple different materials secured together. In addition, header (50) of the present example is generally formed of metal such as a carbon steel alloy. Because header (50) is positioned adjacent to a fresh weld, a metallic construction is generally desirable to provide some heat resistance. However, it should be understood that various alternative materials can be used in other examples.

Header (50) further includes a plurality of openings (60) defined by body (52). Openings (60) are generally configured to direct gas from port (58) towards the weld. As such, openings (60) are generally positioned on the bottom side of header (50) in a position proximate the weld. Each opening (60) of the present example generally has a circular or cylindrical shape. In some examples, this shape may be desirable to promote the non-turbulent flow of gas through each opening (60).

As best seen in FIG. 2, openings (60) of the present example are oriented in a line and spaced equal distances from each other. This configuration is generally configured to provide even shielding and cooling of the weld as gas flows through openings (60). It should be understood that in other examples, openings (60) can have a variety of other alternative configurations. For instance, in some examples, openings (60) can be configured into two, three, or four parallel lines at either identical or staggered intervals. In other examples, openings (60) can be configured in various groupings (e.g., pairs, triads, quads, etc.) spaced at equal distances along the length of body (52). In yet other examples, openings (60) can be replaced with one or more long narrow slits configured to direct non-oxidizing atmosphere to the fresh weld area. Still other configurations for openings (60) will be apparent to those of ordinary skill in the art in view of the teachings herein.

Figure 3:
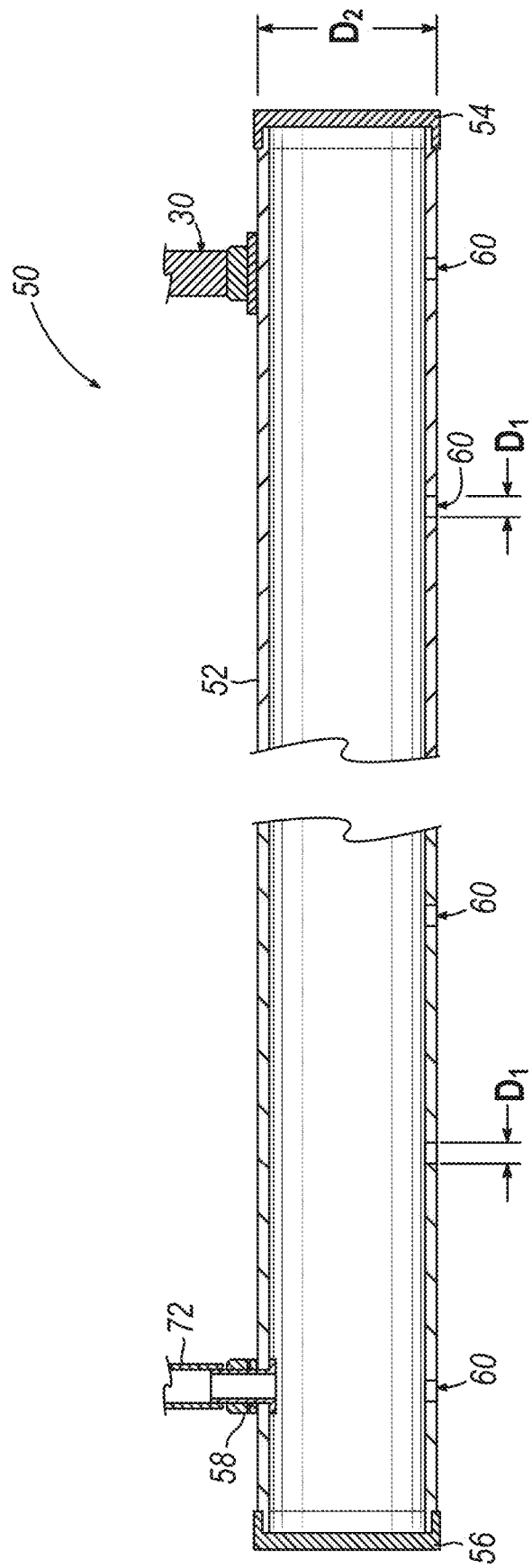
FIG. 3 depicts a cross-sectional view of the header of FIG. 2, the cross-section taken along line 3-3 of FIG. 1.

As best seen in FIG. 3, openings (60) of the present example generally define a diameter $D_1$. Meanwhile, body (52) defines a diameter $D_2$. In the present example, $D_1$ and $D_2$ have a predetermined relationship between each other to promote even flow of gas through each opening (60). For instance, $D_1$ can define an area $A_1$. Meanwhile, $D_2$ can define an area $A_2$. In some examples, the area $A_2$ can be greater than the sum of the area $A_1$ for all openings (60) by a predetermined multiple. In the present example, the predetermined multiple is 2. However, in other examples, the predetermined multiple can be as much as 20. In other words, the area $A_2$ defined by body (52) can be greater than the sum of the area $A_1$ of all openings (60) by a multiple of 2 to 20.

Port (58) in the present example is connected to a non-oxidizing gas source (70) via a tube (72) or hose. Non-oxidizing gas source (70) generally provides a non-oxidizing gas to header (50) at a predetermined pressure. In the present example, a valve (74) is included in-line with tube (72) to control the flow of gas from non-oxidizing gas source (70). The particular pressure used can either be controlled by gas source (70) itself or by valve (74). In either case, pressure is controlled to promote coverage of the weld with gas as the gas flows through openings (60) from port (58) and tube (72).

Non-oxidizing gas source (70) can be configured to provide a variety of gases or mixtures of gases, provided such gases are non-oxidizing in nature. By way of example only, examples of such non-oxidizing gases can include nitrogen, helium and/or argon. In addition, or in the alternative, such non-oxidizing gases can also include reducing gases to actively consume oxygen. Such reducing gases can include hydrogen, carbon monoxide, and/or hydrogen sulfide. Of course, various alternative gases can be used as will be apparent to those of ordinary skill in the art in view of the teachings herein.

The particular length of header (20) in the present example can be determined by the amount of cooling needed. For instance, to reduce oxide formation, it is generally desirable to cool a fresh weld to a temperature of 500° C. or less before removing the non-oxidizing atmosphere provided by header (50). Cooling to this temperature is understood to reduce the presence of a thick oxide layer. In some examples, an oxide layer is deemed "thick" if it is greater than 1 μm. Thus, the length of header (20) is generally configured to be of sufficient length to cool the weld to 500 C or less. Consequently, the length of header (50) can depend on a variety of factors such as the travel speed of sheets/plates (20) relative to header (50), the cooling rate of sheets/plates (20), the thickness of sheets/ plates (20), the heat input provided by welding head (30). In the present example, one suitable length can be 8 feet or more. In other examples, another suitable length can be 3.28 fee (1 meter). In some examples, a suitable length can be determined based on the residence time required to both cool and shroud the thickest steel sheet/plate (20) (e.g., thicknesses of 0.5 to 2.5 mm), at the fastest travel speeds (e.g., 0.05 m/s to 1.5 m/s), and to minimize scale formation.

Example 1

Welds were prepared to butt weld two carbon steel sheets/plates in the flat position using gas tungsten arc welding (GTAW). A first weld (weld A) was prepared using the header (50) described above to provide shielding and cooling to the weld after the weld was formed. A second weld (weld B) was prepared without the header such that the completed weld was exposed to atmospheric air immediately after welding.

After welding and cooling, each weld was sectioned at three locations. Photomicrographs where prepared for each section. Each photomicrograph was analyzed using EpiPhot, a software utility with functionality to measure features in photomicrographs. Such analysis included collecting thickness measurements of the oxide or scale layer shown in each photomicrograph.

Figure 4:
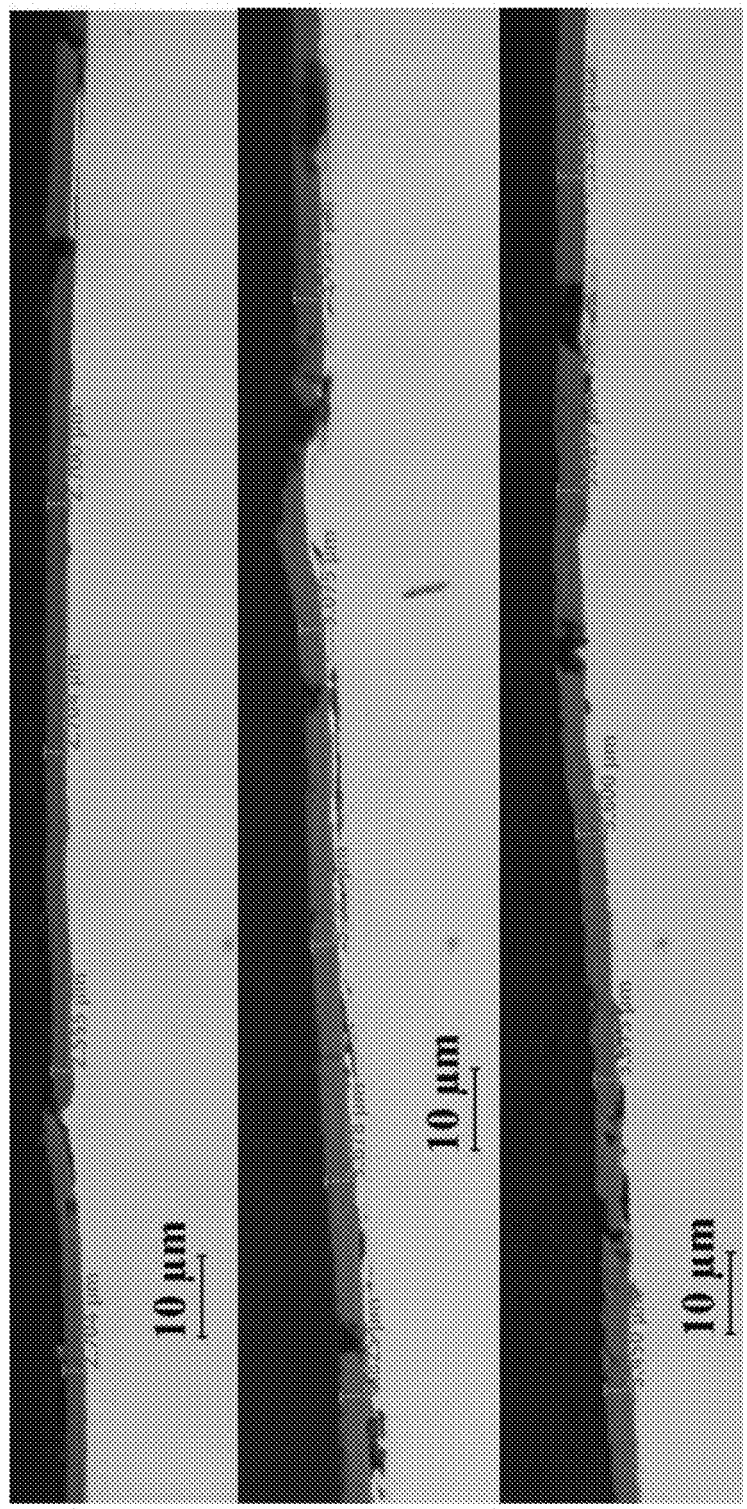
FIG. 4 depicts a photomicrograph of three cross-sections of a first weld specimen, the first weld specimen performed with the header of FIG. 2.
Figure 5:
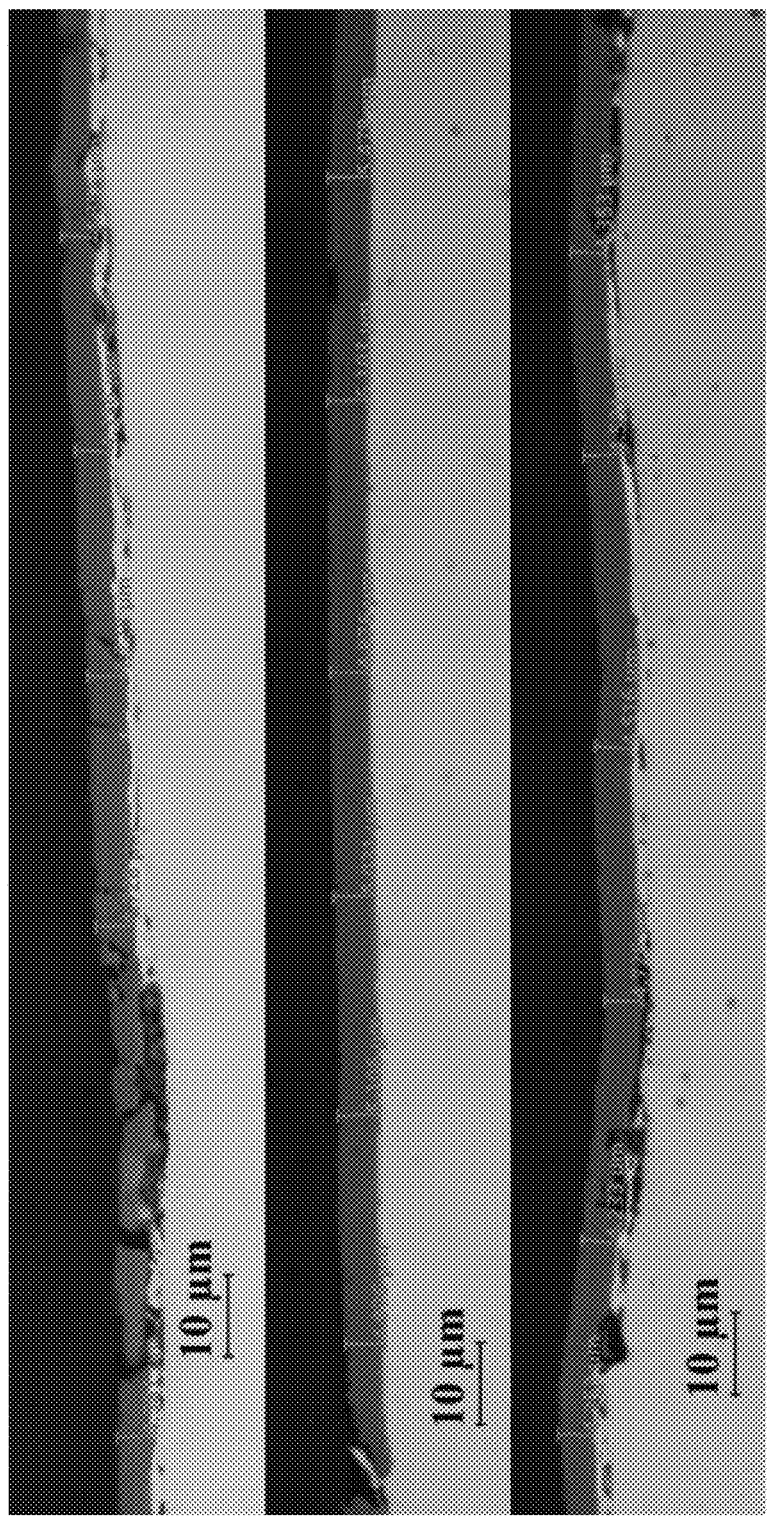
FIG. 5 depicts a photomicrograph of three cross-sections of a second weld specimen, the second weld specimen performed without any shielding and/or cooling.

FIG. 4 depicts photomicrographs for the specimen prepared with header (50). Meanwhile, FIG. 5 depicts photomicrographs for the specimen prepared without header (50). As can be seen in TABLES 1 and 2 below, various oxide or scale measurements were taken to generate an average oxide or scale thickness.

TABLE 1

Oxide Thickness Measurements for Weld A

| Identifier | Measurement (µm) |
|---|---|
| A1 | 2.70 |
| A2 | 2.56 |
| A3 | 2.70 |
| A4 | 2.70 |
| A5 | 3.83 |
| A6 | 3.68 |
| A7 | 3.21 |
| A8 | 3.08 |
| A9 | 3.45 |
| A10 | 3.45 |
| A11 | 3.45 |
| A12 | 3.08 |
| A13 | 3.60 |
| A14 | 3.82 |
| A15 | 3.30 |
| AVG | 3.24 |

TABLE 2

Oxide Thickness Measurements for Weld B

| Identifier | Measurement (µm) |
|---|---|
| B1 | 4.58 |
| B2 | 4.73 |
| B3 | 4.72 |
| B4 | 4.55 |
| B5 | 4.35 |
| B6 | 4.87 |
| B7 | 5.11 |
| B8 | 5.02 |
| B9 | 4.88 |

TABLE 2-continued

Oxide Thickness Measurements for Weld B

| Identifier | Measurement (µm) |
|---|---|
| B10 | 5.10 |
| B11 | 5.48 |
| B12 | 4.26 |
| B13 | 4.23 |
| B14 | 4.73 |
| B15 | 4.52 |
| B16 | 4.50 |
| B17 | 4.35 |
| AVG | 4.70 |

As can be seen by comparing Tables 1 and 2, above, the presence of header (50) reduced oxide thickness by 1.46 µm in comparison to welding performed without header (50). Thus, the presence of header (50) provided over a 30% reduction in the thickness of oxide scale relative to a weld performed without header (50). In actual practice, it is believed that the oxide layer formed during use of header (50) would be substantially thinner due to more through and more uniform coverage due to various parameters of header (50) being customized for the specific weld. It is further believed that the non-shrouded weld of FIG. 5 would have a thicker scale in practice. The presence of this scale would be generally undesirable due to abatement of uniform coverage of the weld area during subsequent annealing and metallic coating processes.

Example 2

Further testing was conducted using a continuous aluminizing line. In particular, welding was performed using welding system (10) detailed above integrated into a continuous aluminizing line to prepare a full aluminized coil. Carbon steel sheets/plates were joined using welding system (10) with header (50). After welding, the welded sheets/plates were subjected to aluminizing.

Figure 6:
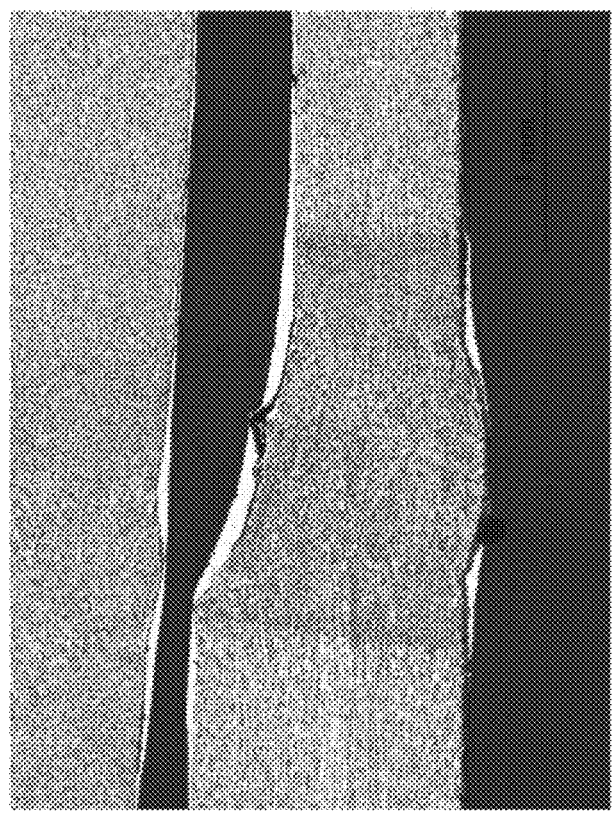
FIG. 6 depicts a photomicrograph of a cross-section of a third weld specimen taken at a first outer diameter of a steel coil, the cross-section taken after coating.
Figure 7:
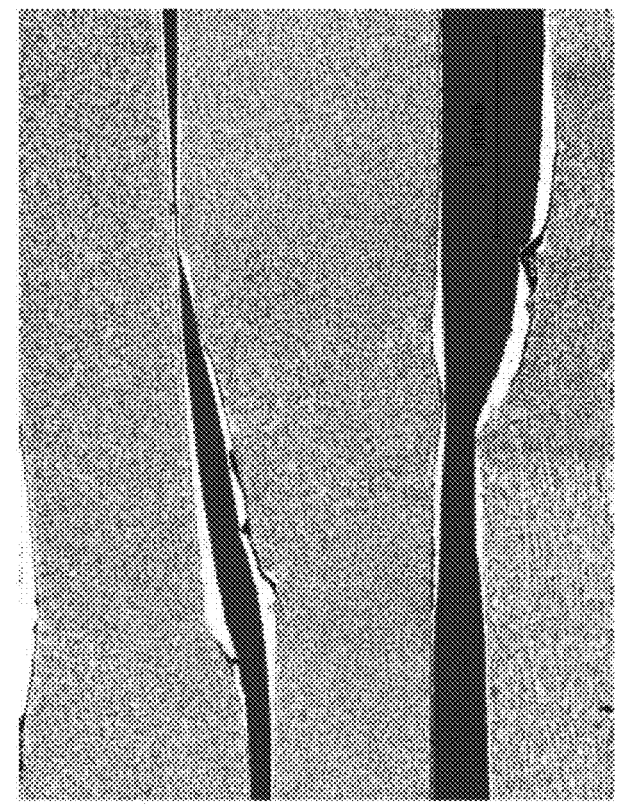
FIG. 7 depicts a photomicrograph of a cross-section of the third weld specimen taken at a second outer diameter of the steel coil, the cross-section taken after coating.
Figure 9:
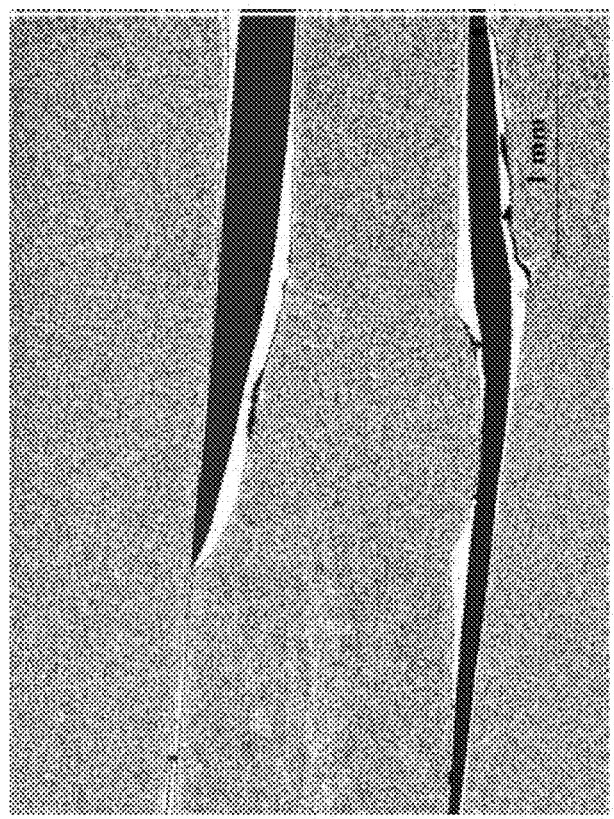
FIG. 9 depicts a photomicrograph of a cross-section of the third weld specimen taken at a second inner diameter of the steel coil, the cross-section taken after coating.
Figure 8:
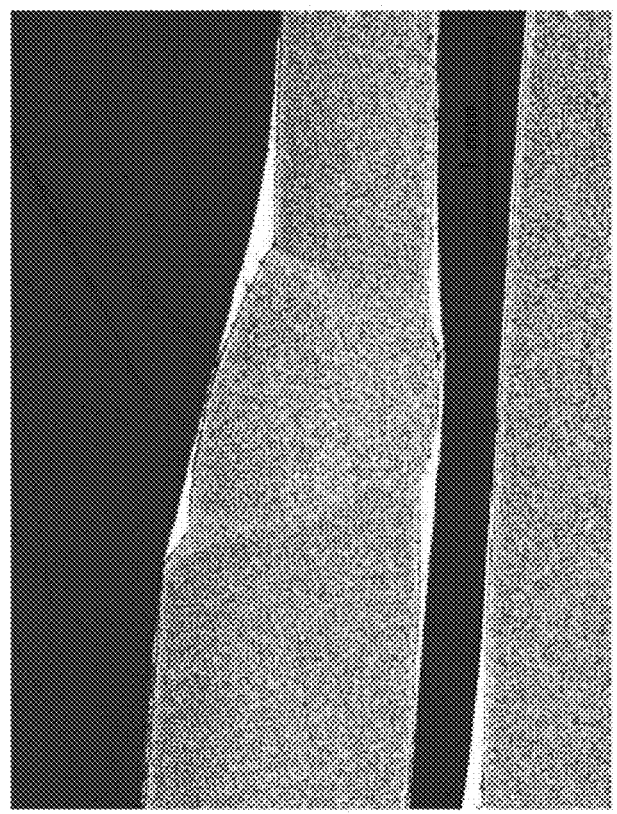
FIG. 8 depicts a photomicrograph of a cross-section of the third weld specimen taken at a first inner diameter of the steel coil, the cross-section taken after coating.

After completion of testing, the specimens were removed from the completed coil both at the outer diameter of the coil and the inner diameter of the coil. Photomicrographs were prepared for each specimen. FIGS. 6 and 7 show photomicrographs for specimens removed from the outer diameter of the coil. Meanwhile, FIGS. 8 and 9 show photomicrographs for specimens removed from the inner diameter of the coil. All of FIGS. 6-9 show welds having acceptable weld quality.

The specimens described above were next subjected to mechanical testing. In particular, tensile tests were performed in a direction perpendicular to the weld direction. Tensile results are shown in Table 3, below.

TABLE 3

Tensile Results

| Specimen | 0.2% OYS (MPa) | UTS (MPa) | Total Elong. Auto, in 2"(%) | Fracture Location |
|---|---|---|---|---|
| ID1 | 463.8 | 797.7 | 5.0 | Thinner HAz |
| ID2 | 480.6 | 835.1 | 7.1 | Thinner BM/HAZ |
| OD1 | 400.3 | 666.9 | 6.3 | Thinner BM/HAZ |
| OD2 | 401.4 | 656.3 | 9.3 | Thinner BM |

The tensile testing shown above indicates acceptable weld quality. For all samples, fracture generally occurred in either the heat-affected zone (HAZ) or the base metal (BM). It should be understood that use of the term "heat-affected zone" used herein generally refers to the region of the weld that was not welded during welding, but instead had its microstructure or material properties altered by welding. Failure in the thinner material was generally expected.

What is claimed is:

1. A system for welding steel sheet or plate continuously, wherein the system comprises:
    a welding head configured to form a weld on one or more steel sheets or plates via relative movement between the one or more steel sheets or plates and the welding head; and
    a header having a hollow body extending away from the welding head in the direction of welding, wherein the body defines a plurality of openings oriented towards the weld, the plurality of openings being oriented along a single axis extending in the direction of welding through each opening of the plurality of openings and corresponding to an electrode of the welding head, wherein the plurality of openings are configured to direct a flow of non-oxidizing gas towards the weld to simultaneously shield the weld from atmosphere and cool the weld,
    wherein each opening of the plurality of openings defines a first diameter having a first area, wherein the header includes a tube defining a second diameter having a second area defined by the second diameter, wherein the openings together define a third area comprising the sum of the first area with respect to each opening, wherein the first diameter and the second diameter define a predetermined relationship between each other configured to promote even flow of gas through each opening of the plurality of openings, wherein the predetermined multiple is greater than or equal to 2 and less than or equal to 20.

2. The system of claim 1, further comprising a non-oxidizing gas source, wherein the header includes a port in communication with the body, wherein a tube extends between the non-oxidizing gas source and the port to communicate non-oxidizing gas to the body.

3. The system of claim 2, further comprising a valve, wherein the valve is in communication with the tube to control the pressure of non-oxidizing gas communicated to the body.

4. The system of claim 2, wherein the non-oxidizing gas source is configured to provide one or more of argon, or nitrogen.

5. The system of claim 1, wherein the body defines a length, wherein the plurality of openings are defined by the body along the length of the body.

6. The system of claim 5, wherein the length of the body is configured to cool the weld to 500° C. or less.

7. The system of claim 5, wherein the length of the body is 1 meter or more.

* * * * *